April 25, 1967 A. E. HOCHSTEIN 3,316,447
INDUCTIVELY ENERGIZED UNIT WITH MEANS
TO IMPEDE PRIMARY CURRENT FLOW
Original Filed Oct. 3, 1960 3 Sheets-Sheet 1
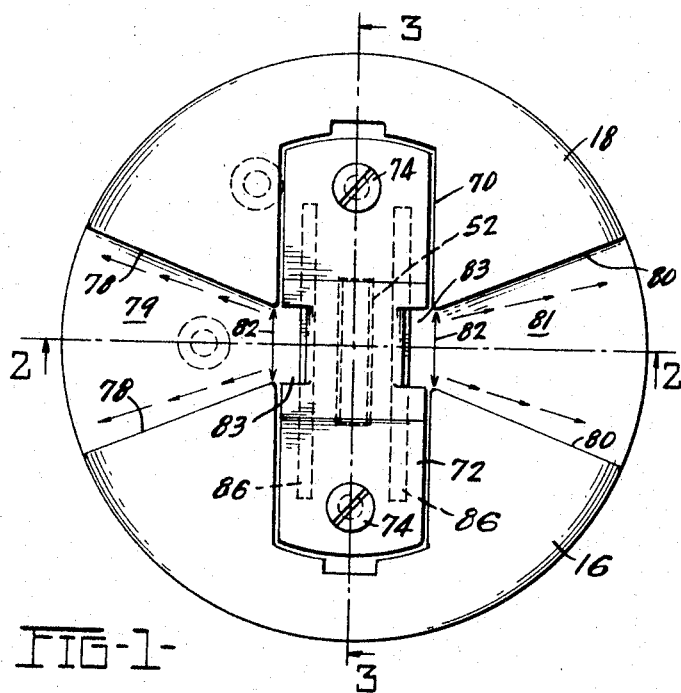
FIG-1-
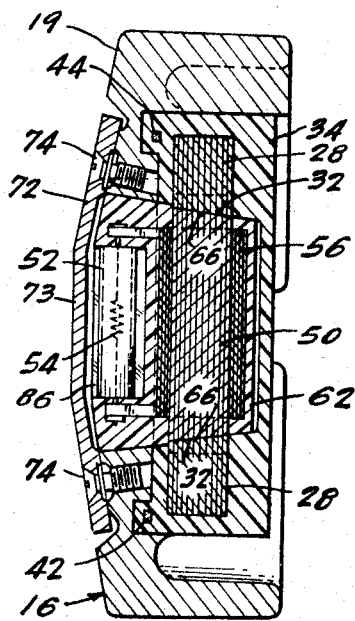
FIG-3-
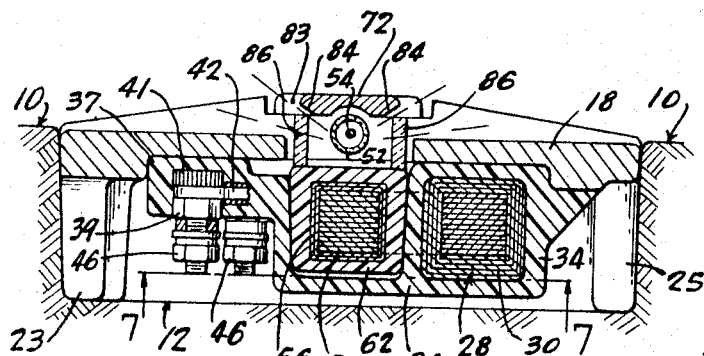
FIG-2-
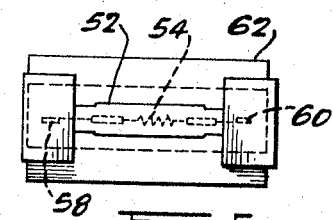
FIG-5-
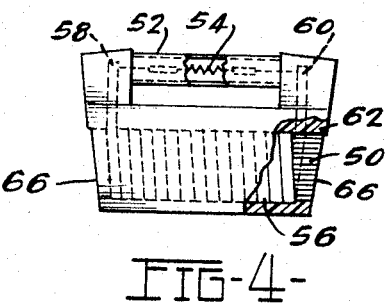
FIG-4-
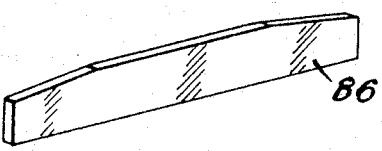
FIG-6-
INVENTOR:
ALEXANDER E. HOCHSTEIN.
BY
Harry O. Ernsberger
ATTORNEY

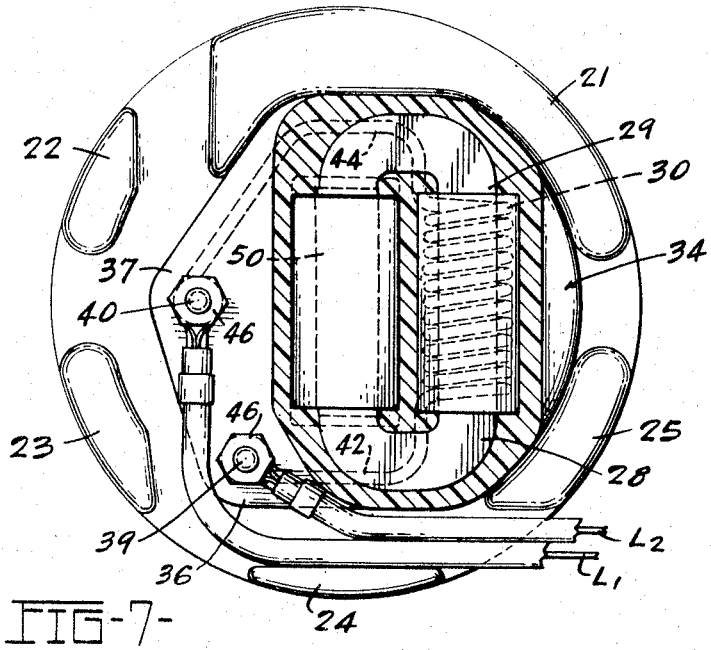
FIG-7-
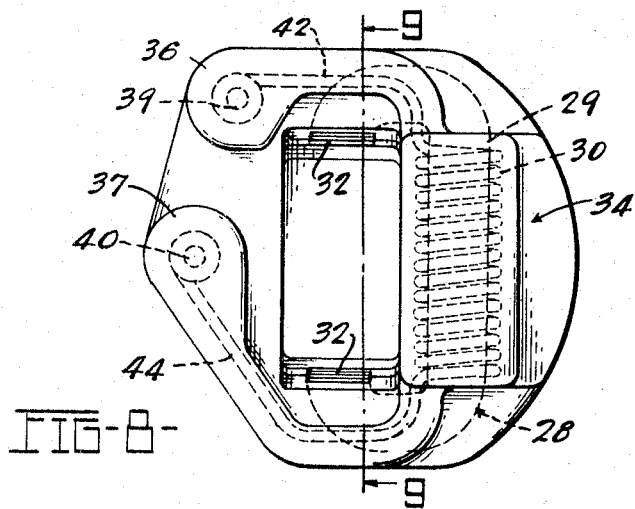
FIG-8-
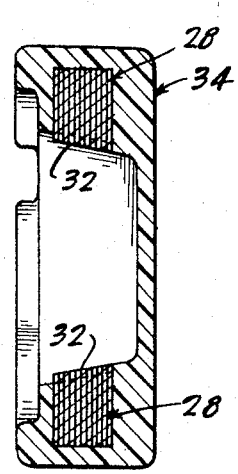
FIG-9-
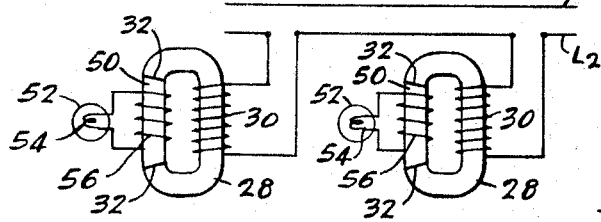
FIG-10-
INVENTOR·
ALEXANDER E. HOCHSTEIN.
BY
Harry O. Ernsberger
ATTORNEY April 25, 1967  A. E. HOCHSTEIN  3,316,447
INDUCTIVELY ENERGIZED UNIT WITH MEANS
TO IMPEDE PRIMARY CURRENT FLOW
Original Filed Oct. 3, 1960  3 Sheets-Sheet 3
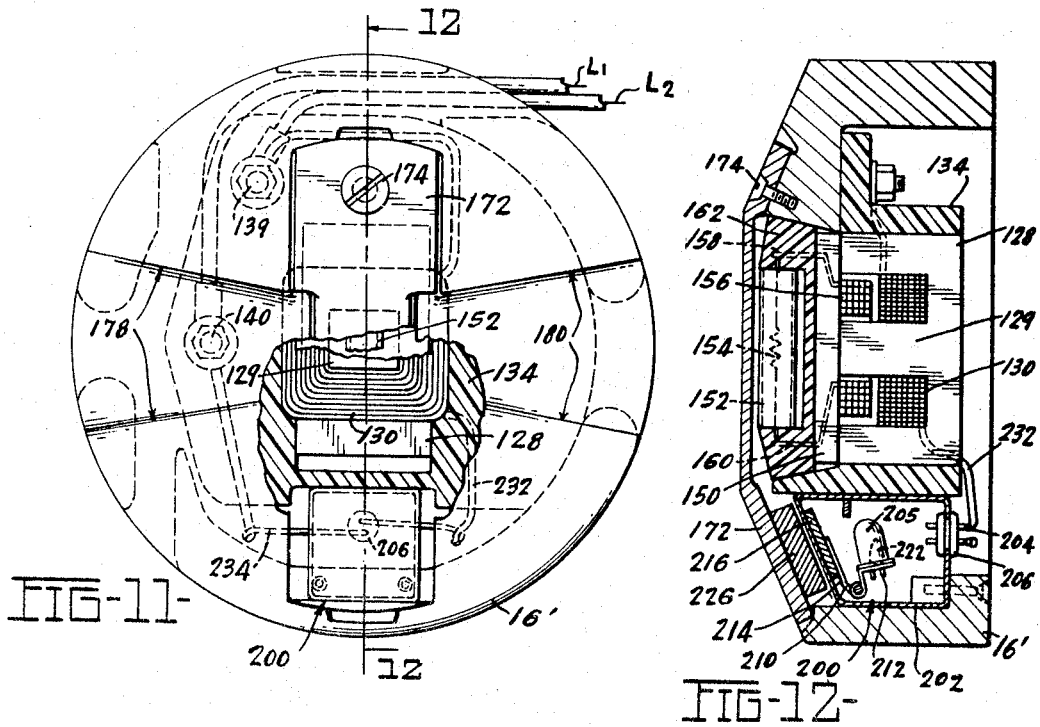
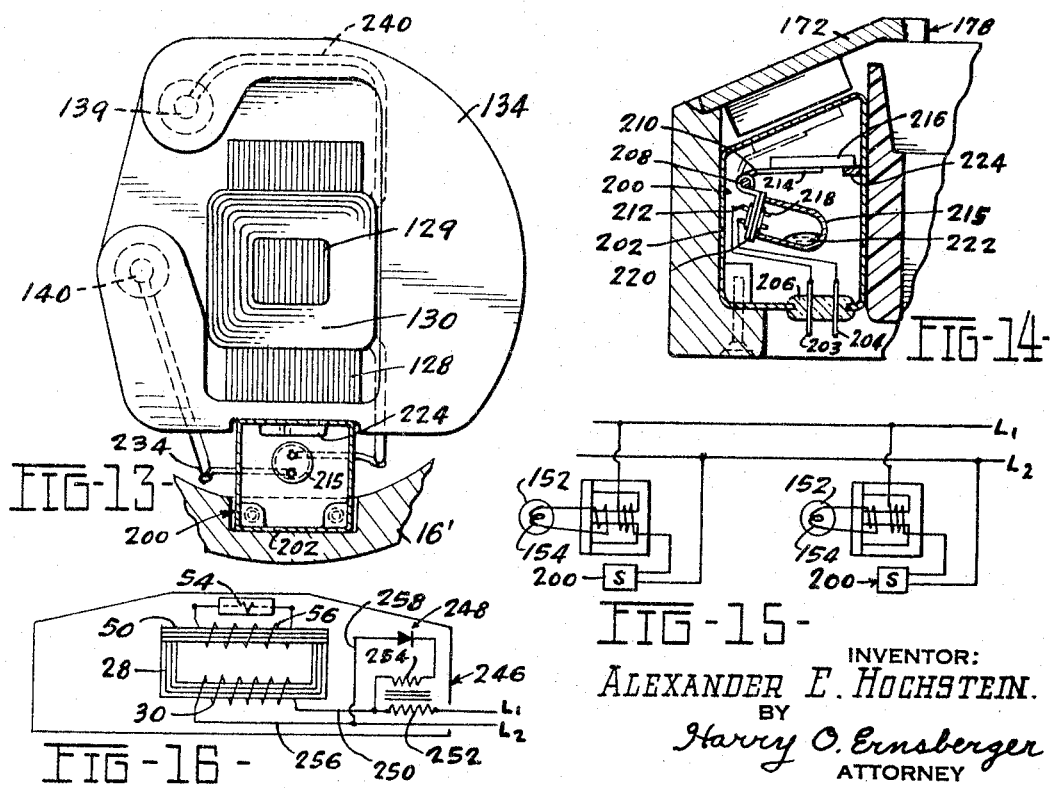
INVENTOR:
ALEXANDER E. HOCHSTEIN.
BY
Harry O. Ernsberger
ATTORNEY

United States Patent Office 3,316,447
Patented Apr. 25, 1967

3,316,447
INDUCTIVELY ENERGIZED UNIT WITH MEANS TO IMPEDE PRIMARY CURRENT FLOW
Alexander E. Hochstein, Toledo, Ohio, assignor to The Strong Electric Corporation, Toledo, Ohio, a corporation of Delaware
Original application Oct. 3, 1960, Ser. No. 59,897, now Patent No. 3,146,954. Divided and this application Mar. 6, 1964, Ser. No. 349,921
1 Claim. (Cl. 315—206)

This invention relates to an inductive coupling for a current consuming medium and more particularly to an inductive coupling arrangement or system for an illuminating means which does not require mechanical connection with an energizing circuit. This is a division of my copending application, Ser. No. 59,897 filed Oct. 3, 1960, now U.S. Patent 3,146,954.

It has been conventional practice in aircraft ramp or runway construction to provide rows of lamps, signal lights or markers which are energized through direct connection of the illuminating means or lamp constructions with an electric current supply line. In such installations, the lamps, their circuit connections and mounting means are subjected to weather conditions and may be rendered inoperative by rain, snow or excessive moisture conditions providing an unreliable signal or marking system for aircraft directional purposes. Furthermore the conventional electrically energizable filament lamps deteriorate through use and the glass envelope becomes clouded by a film or coating resulting from vaporization of tungsten of the lamp filament.

Similar difficulties are encountered with signal or marker lamps on highways and illuminating means installed in the walls of swimming pools and fountains, marine installation illuminants and other kindred installations subject to excessive moisture or inclement weather conditions.

This invention embraces a method or system of transmitting electrical energy to a current consuming device or medium by an inductive coupling requiring no mechanical connections between the electric energy supply and the current consuming medium.

An object of the invention is the provision of inductive means for transmitting electric energy to an illuminant or other current consuming component which is not affected by weather or moisture conditions.

Another object of the invention resides in an inductively coupled lamp construction especially adaptable for installation in a recess formed or provided in a surface area whereby the lamp is disposed substantially in the plane of the surface area, the construction being especially usable for signal lamp or marker installations in aircraft runways, highways or other uses where it is imperative or desirable that the lamp or illuminant be substantially in the plane of the adjacent surface.

Still another object of the invention resides in an inductively coupled current consuming unit arranged to be readily removed and replaced without the necessity of interrupting or forming circuit connections and which is reliable in its operation under all conditions of operation.

Another object of the invention resides in an inductively coupled illuminating unit requiring no exposed circuit connections whereby fire and shock hazard are eliminated rendering the unit adaptable for safe operation in any environment containing combustible or explosive gases.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a plan view illustrating a form of inductively energizable current consuming device of the invention;

FIGURE 2 is a sectional view taken substantially on the line 2—2 of FIGURE 1;

FIGURE 3 is a sectional view taken substantially on the line 3—3 of FIGURE 1;

FIGURE 4 is an elevational view, partly in section, of the device illustrating the inductive coupling therefor;

FIGURE 5 is a top plan view of the construction shown in FIGURE 4;

FIGURE 6 is an isometric view of a light transmitting screen forming a component of the construction;

FIGURE 7 is a sectional view taken substantially on the line 7—7 of FIGURE 2;

FIGURE 8 is a top plan view of the primary coil and core construction of the energizing section;

FIGURE 9 is a sectional view taken substantially on the line 9—9 of FIGURE 8;

FIGURE 10 is a schematic view of a circuit for inductively energizing a plurality of current consuming devices;

FIGURE 11 is a top plan view illustrating a modified form of the invention, certain parts being shown in section;

FIGURE 12 is a sectional view taken substantially on the line 12—12 of FIGURE 11;

FIGURE 13 is a fragmentary sectional view of components illustrated in FIGURE 12;

FIGURE 14 is a detail sectional view of a switch construction embodied in the primary circuit;

FIGURE 15 is a schematic diagram of one form of circuit connections for units of the character illustrated in FIGURES 11 through 14, and FIGURE 16 is a schematic diagram of another form of control means for the primary circuit.

While the forms of the invention illustrated are particularly adaptable for use as signal or marker lamps for an aircraft runway or ramp, it is to be understood that the apparatus of the invention may be used wherever the same may be found to have utility.

Referring to the drawings in detail, the forms of apparatus of the invention are particularly adapted to be disposed in suitable recesses or wells formed in the runway or roadway or other surface so that the illumination is slightly above the plane of the surrounding surface area so as to present a minimum of obstruction in the runway or roadway and provide satisfactory illumination for the intended purposes. As shown in FIGURE 2, a portion of an aircraft runway or a roadway in cross-section is indicated at 10 provided with a substantially circular recess or well 12 to receive aparatus of the invention.

While the illuminating unit constructions in the embodiments illustrated are of substantially circular contour, it is to be understood that the housing construction of the unit may be of other suitable shape.

Referring particularly to the arrangement shown in FIGURES 1 through 10, the form of apparatus shown therein is inclusive of a housing structure 16, the housing formed with a substantially circular disc-like portion 18 having depending, peripherally disposed wall portions 21, 22, 23, 24 and 25, shown in FIGURE 7, which extend into the well 12 formed in the runway, roadway or the like.

The projections generally define a chamber or recess beneath the disc-like portion 18 of the housing to accommodate the components of a transformer construction providing the inductive coupling for energizing a current consuming medium. The transformer construction is inclusive of a generally U-shaped core section 28 of magnetic material such as ferrous materials and may be of conventional construction. The elongated or bight portion 29 of the core 28 is surrounded by a primary coil 30 which is adapted to be energized from a suitable alternating current supply.

The extremities 32 of the U-shaped core 28 are arranged in opposed relation, as shown in FIGURE 8, and are arranged in slightly convergent relation as shown in FIGURE 9. The transformer core section 28 and the primary coil 30 are embedded or enclosed in a capsule 34 which may be of any suitable material having insulation characteristics and which is weather proof. The capsule may be fashioned of such materials as epoxy resins, silicon rubber-type resin, phenolflormaldehyde, ureaformaldehyde, glass ceramics, minerals or other materials which are castable or moldable and of low porosity, or hydraulic cements which are moisture proof and which will withstand weather conditions.

As particularly shown in FIGURES 2, 7 and 8, the capsule 34 enclosing the core section 28 and primary coil 30 is fashioned with projecting portions 36 and 37 in which binding posts or terminal members 39 and 40 are molded or cemented in the projections. Each of the binding posts may be fashioned with a serrated extension 41 to foster a secure bond between the binding posts and the material of the capsule 34.

The lead 42 of the primary coil 30 is joined with the terminal portion 39, shown in FIGURE 2, and the lead 44 of the opposite end of the coil is joined with the terminal member 40. The terminal posts 39 and 40 are connected respectively with current supply conductors L1 and L2 which are secured to the terminal posts by means of threaded nuts 46, shown in FIGURE 2. The molded capsule 34 is bonded to the disc-like portion 18 of the housing by any suitable bonding medium or cement which is compatible with the material of which the capsule is formed.

If desired, the housing of the unit may be fashioned of the capsulating material shaped or configured to embrace the primary coil and its core section and molded as an integral unit.

In the embodiment illustrated, a current consuming medium or component such as an electrically energizable filament or lamp is arranged to receive electrical energy inductively from the energizable primary coil 30 and its core section 28. In the embodiment illustrated, the inductively coupled unit is inclusive of an elongated laminated core 50, a high temperature resistant transparent envelope 52 enclosing or containing an electrically energizable filament 54 or other current consuming means, and a coil 56 forming the secondary coil of the transformer means.

The core 50, primary coil 56 and the terminal connections 58 and 60 of the coil 56 are embedded or encapsulated in a suitable shroud or enclosure 62. The shroud 62 may be molded of suitable resin such as epoxy resins or the other materials hereinbefore mentioned as being suitable for the capsule 34 and which is waterproof and capable of withstanding weather conditions. The light transmitting envelope 52 is a sealed unit whereby the filament 54 or other illuminant is hermetically sealed within the envelope and the connections 58 and 60 at the ends of the coil joined with the ends of the filament 54 are embedded or sealed in the capsule 62 so as to be moisture proof.

It should be noted that the end surfaces 66 of the elongated laminated core section or bar 50 are in convergent relation to the same extent that the extremities 32 of the U-shaped core 29 are convergent or shaped so that the inductively coupled unit, in assembled position, effects a positioning of the ends 66 of the core section 50 in contact with the extremities 32 of the core section 28 so as to provide a substantially closed metallic magnetic path for the efficient induction transfer of electromotive forces generated in the core structure under the influence of current flow to the secondary coil 56.

The magnetic forces in the core inductively set up an alternating electromotive force in the secondary coil 56 to energize the filament or illuminating medium 54 in the envelope 52. It should be noted that there are no mechanical or terminal connection between the inductively coupled unit and the current supply.

The inductively coupled unit is shrouded or enclosed in a waterproof capsule 62, so that moisture, even immersion, of the inductively coupled unit in water will not impair the energization of the current consuming medium or unit 54.

Means is provided for retaining the inductively coupled unit in operative or energizable position with the primary of the transformer. The upper surface of the disc-like portion 18 is fashioned with a substantially rectangular recess 70 which accommodates a plate or escutcheon 72 shown in FIGURES 1, 2 and 3. The plate or escutcheon 72 is removably secured to the housing 16 by screws 74 extending into threaded openings in the housing as shown in FIGURE 3.

The upper surface 19 of the disc portion 18 of the housing is of slight frusto-conical or calotte shape so that the central region is elevated above planar surface of the runway or roadway to facilitate generally lateral transmission of light from the illuminant 54. The upper surface of the plate or escutcheon 72 adjacent the tapered surface 19 is shaped to lie flush with the frusto-conical shape of the surface 19, the central portion 73 of the escutcheon 72 being in substantial parallelism with the plane of the runway or roadway surface.

Where the arrangement of the invention is utilized as a direction marker or illumination for an aircraft runway, it is desirable that the light transmitted from the illuminant 54 be shielded to provide the proper direction of illumination.

To attain this result the disc-like portion of the housing 16 is fashioned with pairs of angularly divergent surfaces 78 and 80, the surfaces 78 defining a sector shaped region or recess 79, and the surfaces 80 defining a like sector shaped recess or region 81.

The sector shaped regions 79 and 81 have a common axis and the filament 54 is arranged at the region of convergence of the surfaces so that the light transmitted from the filament 54 is projected in generally opposite directions as indicated by the arrows in the regions 79 and 81 as indicated in FIGURE 1. The points of the nearest convergent of the pairs of surfaces 78 and 80 are spaced to provide throats 82 of sufficient dimension to establish projected beams of light through the regions 79 and 81, each region being an included angle of about 50°. The surfaces 78 and 80 may be of greater or less angularity depending upon the contour or restriction of the path of illumination desired.

The lower surface of the central region 73 of the plate 72 is provided with recesses 83 having upwardly flared, angularly arranged surfaces 84 to facilitate limited or restricted upwardly directed projection of light indicated by the arrows in FIGURE 2. Preferably disposed at each side of the light transmitting envelope 52 is a light transmitting screen or member 86 of the configuration illustrated in FIGURE 6. The screens 86 provide a measure of protection from damage to the light transmitting envelope 52 and may be colored to provide colored illumination. The screens 86 may be made of high temperature resistant glass, light transmitting plastic or other light transmitting material.

FIGURE 10 illustrates the circuit arrangement for the inductive coupling unit of the invention where two or more units are used in series. Current from the line L1, L2 flows through the primary coil 30 inducing or setting up an alternating electromotive force or flux in the secondary coil and core structure 50, establishing current flow through the secondary coil 56 energizing the filament or current consuming medium 54 contained in the light transmitting envelope 52.

It will be seen that the positioning of the core 50 in the gap between the extremities 32 of the U-shaped core section 28 completes an effective metallic magnetic path for the magnetic flux so that a highly efficient coupling is provided for establishing electric energy flow in the secondary coil 56. When it is desired to remove or replace the inductively powered unit illustrated in FIGURES 4 and 5, the screws 74 and the plate or escutcheon 72 are removed. The unit may be removed without affecting the primary coil or its energizing circuit.

As a practical illustration of the energy input and output of the inductively coupled construction where several of such units are utilized for direction indication on aircraft runways, several of the units are arranged with the primary coils 30 connected in series with a supply line L1, L2 of alternating current. This is illustrated in FIGURE 10. For a 45 watt current consuming medium or filament 54 as an illuminating unit, the voltage on each primary is preferably of from 2 to 4 volts but may be of different value dependent upon the voltage of the alternating current supply.

With a 45 watt filament 54, the voltage in the secondary coil 56 is approximately 7 volts and the current flow through the filament 54 is approximately 6.6 amperes. For aircraft runway installation, a particular type of illuminating unit is preferred in order to secure long life of the illuminant and without impairment of the amount or intensity of light produced. For such use, the light transmitting envelope 52 is formed of quartz glass or the like having high temperature resistant characteristics.

A tungsten or tungsten alloy filament may be employed, and at the time of fabrication of the illuminating unit, a small quantity of iodine crystals are placed in the envelope before it is sealed. It is known that under the heat of current flow through a tungsten filament, some of the tungsten vaporizes and, after prolonged use, the tungsten vapor creates a mask or film on the interior surface of the lamp envelope impairing light transmission.

The type of lamp employed in the inductively coupled unit for aircraft runway installation is adapted for operation at a sufficiently high temperature to effect vaporization or volatilization of iodine crystals forming a gas within the envelope which substantially eliminates sublimation of the tungsten of the filament and hence substantially occludes the volatilization of the tungsten and the formation of a film of tungsten in the inner surface of the envelope 52.

With such illuminating unit it is imperative to operate the unit at a temperature sufficient to vaporize the iodine crystals. It has been found that the maintenance of a temperature of between 475° and 990° Fahrenheit effectively maintains the iodine in a vapor state. Thus for aircraft runway installation, the resistance of the filament 54 and the capacity of the secondary coil 56 are of a character so that a substantial amount of heat is developed in the envelope 52 in order to maintain the iodine in a vapor state and prevent clouding or impairment of the projected light.

It is to be understood that other forms of electrically energizable lamps of different wattage may be employed and inductively energized through the secondary coil 56. As shown in FIGURE 10, a plurality of the inductively energized units of the invention may be advantageously employed in a circuit as one or more lamp units may become inoperative without affecting the illumination of the remaining units.

FIGURES 11 through 14 illustrate a modified form of the invention wherein means is incorporated to avoid or prevent damage to the primary circuit when the core of the secondary circuit is removed from the unit. The arrangement illustrated includes a housing structure 16′ which is substantially the same as the housing structure 16 illustrated in FIGURES 1 through 3. Disposed in the housing 16′ is a primary core structure 128 preferably of E-shape, the central projection 129 of which is surrounded by primary coil 130 as particularly shown in FIGURES 12 and 13.

The core structure 128 may be of a conventional laminated type or of other suitable construction. The core 128 and the coil 130 are capsulated in an insulating material or capsule 134. While the capsule 134 is illustrated as a component independent of the housing 16′, it is to be understood that the housing may be made of the same material as the capsule and the two components molded as an integrated unit or single member.

The current consuming device which is made removable includes a bar-like core 150 which, in a position of use, is in metallic contact with the end projections of the core 128 and the central projection 129 to complete a metallic path for the magnetic lines of force. The removable unit includes a secondary coil 156 which also surrounds the projection 129 of the core 128 but is removable with the current consuming unit. The removable unit includes a transparent envelope 152 containing or enclosing an electrically energizable filament 154. The connections 158 and 160 connect the ends of the secondary coil 156 with the filament 154. The components of the removable unit are enclosed in a capsule 162 of insulating material and are thus sealed so as to be moisture proof.

The removable current consuming unit is held in place by a plate or escutcheon 172 secured in position by a screw 174. The housing arrangement illustrated in FIGURE 11 is formed with pairs of convergently arranged surfaces 178 and 180 for predetermining or defining the paths of light rays emanating from the energizable filament 154 in the same manner as hereinbefore described in connection with the form of construction shown in FIGURES 1 through 3. The capsule 134 is provided with terminals 139 and 140.

The arrangement shown in FIGURES 11 through 14 is inclusive of a means for protecting the primary circuit when the core 150 of the removable unit is disengaged from its normal position of use with the core 128. In the arrangement shown in FIGURES 11 through 14, the protective means is inclusive of a switch mechanism 200 which is automatically operative when the retainer plate 172 is removed from the housing to interrupt or break the circuit of the current supply to the primary coil 130. In the embodiment illustrated, the switch 200 includes an enclosure or housing 202 which is moisture proof.

The terminals 203 and 204 for the switch means are embedded in a member 206 of insulating material, such as glass, which is sealed in an opening in the switch housing 202. Pivotally supported upon a pivot pin 208 in the housing 202 is a lever 210, one arm 212 of the switch supporting a sealed envelope 215 of insulating material such as glass or the like, the other arm 214 of the lever supporting a block or plate 216 of magnetic material.

The terminals 203 and 204 are connected with terminals of contact members 218 and 220 in the envelope 215, a globule of mercury 222 being contained within the envelope 215 and serving as a circuit closing means for completing a circuit across the contacts 218 and 220 when the lever 210 is in circuit-closing position. The pivotal movement of the lever 210 is limited by an abutment 224 carried by a wall of the housing 202 as shown in FIGURE 14.

The removable plate or escutcheon 172 is provided with a plate or block 226 of magnetized metal which is secured to the plate by bonding material or other suitable securing means. It will be apparent that when the escutcheon plate 172 is secured in position on the housing 16′, the plate 226 of magnetized material is adjacent an upper wall of the switch housing 202 and attracts the plate 216 of magnetic material, swinging the lever to the position illustrated in FIGURE 12 with the globule of mercury 222 establishing a circuit across the contacts 218 and 220 in the envelope to complete a circuit through the primary coil 130.

The circuit connection 232 of the primary coil 130 is connected to one of the contacts within the envelope 215 through the terminal 204, the other contact being connected by a circuit connection 234 with the terminal 140, the other end of the primary coil being connected through a connection 240 with the terminal 139. The current supply is adapted to be connected with the terminals 139 and 140 for energizing the unit.

Whenever the current consuming unit is in a position of use and the escutcheon plate 172 is affixed to the housing, the switch mechanism is in the position shown in FIGURE 12 completing a circuit through the coil 130. Whenever the plate 172 and the magnetized bar or block 226 are removed from the housing 16', the switch lever 210 moves by gravity to the position shown in FIGURE 14 whereby the globule of mercury 222 in the envelope 224 flows away from the contacts 218 and 220 so as to interrupt the circuit of the primary coil 130 thus deenergizing the coil.

FIGURE 15 illustrates a typical circuit arrangement showing two units of the invention shown in FIGURES 11 through 14 connected in parallel with the current supply lines L1 and L2, it being understood that a greater number of units may be connected to the supply line. In this form of circuit arrangement, the primary of each unit is subject to the supply voltage as the units are connected in parallel.

FIGURE 16 is a schematic illustration of another means or medium for protecting the primary coil from damage in the event that the core associated with the secondary coil or current consuming unit is removed from its operative position. The arrangement shown in FIGURE 16 is usable in the circuit of the form of the invention illustrated in FIGURES 1 through 10 or the arrangement shown in FIGURES 11 through 14. As shown in FIGURE 16, the primary coil 30 is associated with the magnetic core 28, the removable unit comprising a removable core 50, an associated coil 56 and an energizable current consuming unit or filament 54.

In the arrangement shown in FIGURE 16, the protective means for the primary coil 30 includes a saturable reactor 246 and a rectifier or valve 248. One end of the primary coil 30 is connected by a lead 250 with adjacent ends of coils 252 and 254 of the saturable reactor 246. The other end of the primary coil 30 is connected by a lead 256 with a lead 258 to the rectifier 248 and to one side L2 of the current supply. The other end of coil 252 of the reactor is connected with the current supply line L1. The rectifier 248 may be of the crystal type or a diode to effect one-way flow of current in the direction of the arrow.

The primary coil 30 is in series with the coil 252 of the saturable reactor 246. The second coil 254 of the saturable reactor is in series with the rectifier 248 and across the primary coil 30. When the current consuming unit including the core 50, secondary coil 56 and current consuming medium 54 are in a position of use wherein the core 50 completes the magnetic path of flux of the core 28, a voltage exists across the coil 30 due to the high impedance of coil 30. This voltage effects current flow in one direction, viz. the direction of the arrow through the rectifier 248 and the coil 254 of the saturable reactor. The saturable reactor 246 is saturated and hence there is a minimum of impedance in the coil 252.

When the current consuming unit including the core 50 is removed from its position of use and from the influence of the primary coil 30 and its associated core 28, the impedance of coil 30 is reduced to a minimum and hence a minimum of voltage is established across the primary coil 30 which is insufficient to saturate the reactor 246, a condition which greatly increases the impedance of the coil 252 of the reactor in the current supply sufficient to restrict or limit current flow through the primary coil 30 and thus prevent or avoid damage to or impair the operability of the coil 30 which might otherwise take place because of excessive current flow to the coil 30. Thus the primary coil may be protected against damage by means such as the switch means shown in FIGURES 11 through 14 or the saturable reactor and rectifier arrangement illustrated in FIGURE 16.

The several forms of the invention may be advantageously employed in environments where explosive or combustible gas mixtures may be present such as in mines, chemical plants, testing laboratories, flour or feeding mills, sugar refineries, grain elevators, hospitals, marine vessels, aircraft, gasoline dispensing stations, oil refineries, or for use in swimming pools, bathrooms or in any locale where hazard of electric shock may be present. There is no liability of arcing as there are no open or unprotected contacts or connections to be made or interrupted through the use, removal or replacement of the inductively energizable current consuming units.

It is apparent that, within the scope of the invention, modifications and different arrangements may be made other than as herein disclosed, and the present disclosure is illustrative merely, the invention comprehending all variations thereof.

I claim:

In combination, a system including a primary electrically energizable electromagnetic unit, a removable secondary electromagnetic unit, a current consuming medium connected with the secondary unit, said secondary unit being normally in inductive relation with the primary unit whereby current flow through the primary unit inductively establishes current flow in the secondary unit and current consuming medium, and means including a saturable reactor and a rectifier in circuit with the primary unit to impede current flow thereto when the secondary unit is out of inductive relation with the primary unit.

References Cited by the Examiner

UNITED STATES PATENTS

| | | | |
|---|---|---|---|
| 1,505,325 | 8/1924 | Elbert. | |
| 2,133,494 | 10/1938 | Waters | 315—279 X |
| 2,415,688 | 2/1947 | Hall | 336—119 X |
| 2,997,528 | 8/1961 | Kessel | 336—96 |

JOHN W. HUCKERT, *Primary Examiner.*

D. O. KRAFT, *Assistant Examiner.*